US012266151B2

(12) United States Patent
Onuki (10) Patent No.: US 12,266,151 B2
(45) Date of Patent: Apr. 1, 2025

(54) INFORMATION PROCESSING APPARATUS, INFORMATION PROCESSING METHOD, AND PROGRAM

(71) Applicant: Sony Interactive Entertainment Inc., Tokyo (JP)

(72) Inventor: Yoshikazu Onuki, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 499 days.

(21) Appl. No.: 17/633,799

(22) PCT Filed: Aug. 13, 2020

(86) PCT No.: PCT/JP2020/030818
§ 371 (c)(1),
(2) Date: Feb. 8, 2022

(87) PCT Pub. No.: WO2021/033626
PCT Pub. Date: Feb. 25, 2021

(65) Prior Publication Data
US 2022/0327805 A1 Oct. 13, 2022

(30) Foreign Application Priority Data

Aug. 22, 2019 (JP) .................................. 2019-151993

(51) Int. Cl.
*G06V 10/764* (2022.01)
*G06V 10/77* (2022.01)
*G06V 40/16* (2022.01)

(52) U.S. Cl.
CPC ........ *G06V 10/764* (2022.01); *G06V 10/7715* (2022.01); *G06V 40/161* (2022.01); *G06V 40/168* (2022.01)

(58) Field of Classification Search
CPC ............. G06V 10/764; G06V 10/7715; G06V 40/161; G06V 40/168; G06V 40/176; G06F 3/01; G06T 7/00; G06T 7/20; G10L 15/10
See application file for complete search history.

(56) References Cited

U.S. PATENT DOCUMENTS

2011/0007079 A1\* 1/2011 Perez ...................... A63F 13/56
345/473
2014/0289323 A1\* 9/2014 Kutaragi ................. H04L 67/01
709/206

(Continued)

FOREIGN PATENT DOCUMENTS

JP 2012533134 A 12/2012
JP 2018163400 A 10/2018

OTHER PUBLICATIONS

International Search Report for corresponding PCT Application No. PCT/JP2020/030818, 4 pages, dated Oct. 27, 2020.

*Primary Examiner* — Md K Talukder
(74) *Attorney, Agent, or Firm* — Kilpatrick Townsend & Stockton LLP (57) ABSTRACT

An information processing apparatus includes a data collection section, a relation learning section, and a map generation section. The data collection section collects a feature quantity of a physical movement of a user and situation information indicating a situation of the user when the physical movement is made. The relation learning section creates a learned model for classification of the feature quantity of the physical movement according to the situation information, by learning a relation between the feature quantity of the physical movement and the situation information. The map generation section generates, on the basis (Continued)

of the learned model, a map that is capable of associating the situation information with the feature quantity of the physical movement.

9 Claims, 6 Drawing Sheets

(56) References Cited

U.S. PATENT DOCUMENTS

| | | | |
|---|---|---|---|
| 2019/0087734 A1* | 3/2019 | Ide | G06V 40/20 |
| 2019/0110022 A1* | 4/2019 | Ichiboshi | G10L 15/22 |
| 2021/0370519 A1* | 12/2021 | Ishii | G10L 21/06 |
| 2022/0327805 A1* | 10/2022 | Onuki | G06F 3/01 |

* cited by examiner

INFORMATION PROCESSING APPARATUS, INFORMATION PROCESSING METHOD, AND PROGRAM

TECHNICAL FIELD

The present invention relates to an information processing apparatus, an information processing method, and a program.

BACKGROUND ART

For example, PTL 1 discloses a model learning apparatus that generates a model for estimating, on the basis of temporal correspondence between a feature quantity of a gesture made while a person utters something and a word vector of a word included in the utterance, an uttered word from the feature quantity of the gesture.

CITATION LIST

Patent Literature

[PTL 1] Japanese Patent Laid-Open No. 2018-163400

SUMMARY

Technical Problem

Meanwhile, advanced voice recognition technologies increase accuracy in recognizing details of an utterance from a voice. That is, it has become possible to recognize details of an utterance with high accuracy without estimation from a gesture.

However, because PTL 1 described above focuses on a correlation between a feature quantity of a gesture and an uttered word and the object thereof is to estimate an uttered word from the feature quantity of the gesture, PTL 1 is limited in its application.

In light of the foregoing, it is an object of the present invention to provide an information processing apparatus, an information processing method, and a program that allow a user to have a better experience by using a correlation between a user's physical movement and information indicating a situation of the user when the physical movement is made.

Solution to Problem

According to an aspect of the present invention, there is provided an information processing apparatus that includes a data collection section, a relation learning section, and a map generation section. The data collection section collects a feature quantity of a physical movement of a user and situation information indicating a situation of the user when the physical movement is made. The relation learning section creates a learned model for classification of the feature quantity of the physical movement according to the situation information, by learning a relation between the feature quantity of the physical movement and the situation information. The map generation section generates, on the basis of the learned model, a map that is capable of associating the situation information with the feature quantity of the physical movement.

According to another aspect of the present invention, there is provided an information processing apparatus that includes a situation information acquisition section and a physical movement creation section. The situation information acquisition section acquires first situation information indicating a situation observed by a user. The physical movement creation section virtually creates a second physical movement from a feature quantity associated with the first situation information, by using a map generated on the basis of a learned model created by learning a relation between a feature quantity of a first physical movement of the user that was made in the past and second situation information indicating a situation of the user when the first physical movement was made.

According to still another aspect of the present invention, there is provided an information processing method that includes a step of collecting a feature quantity of a first physical movement of a user and first situation information indicating a situation of the user when the first physical movement is made, a step of creating a learned model for classification of the feature quantity of the first physical movement according to the first situation information, by learning a relation between the feature quantity of the first physical movement and the first situation information, a step of acquiring second situation information indicating a situation observed by the user, and a step of virtually creating a second physical movement from a feature quantity associated with the second situation information, by using a map generated on the basis of the learned model.

According to still another aspect of the present invention, there is provided a program for causing a computer to implement a function of collecting a feature quantity of a physical movement of a user and situation information indicating a situation of the user when the physical movement is made, a function of creating a learned model for classification of the feature quantity of the physical movement according to the situation information, by learning a relation between the feature quantity of the physical movement and the situation information, and a function of generating, on the basis of the learned model, a map that is capable of associating the situation information with the feature quantity of the physical movement.

According to still another aspect of the present invention, there is provided a program for causing a computer to implement a function of acquiring first situation information indicating a situation observed by a user and a function of virtually creating a second physical movement from a feature quantity associated with the first situation information, by using a map generated on the basis of a learned model created by learning a relation between a feature quantity of a first physical movement of the user that was made in the past and second situation information indicating a situation of the user when the first physical movement was made.

With the configuration described above, it is possible to virtually create a physical movement tailored to a situation observed by a user, on the basis of a learning result of a relation between a feature quantity of a physical movement and situation information, thus allowing the user to have a better experience.

DESCRIPTION OF EMBODIMENTS

A detailed description will be given below regarding several embodiments of the present invention with reference to attached drawings. It should be noted that components having substantially the same functional configuration are denoted by the same reference signs in the present specification and drawings, and redundant description thereof will be omitted.

First Embodiment

Figure 1:
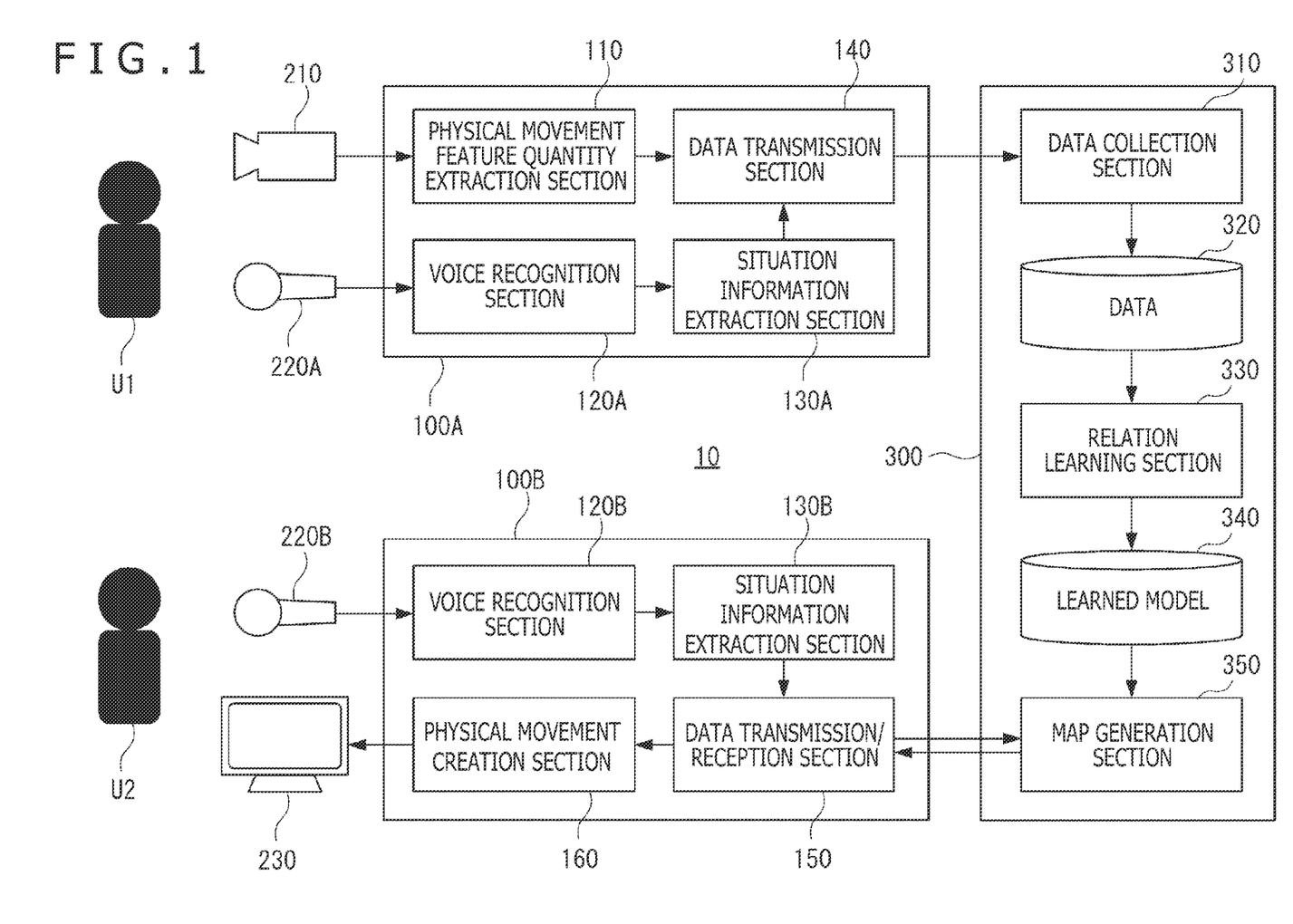
FIG. 1 is a block diagram illustrating a schematic configuration of a system including an information processing apparatus according to a first embodiment of the present invention.

FIG. 1 is a block diagram illustrating a schematic configuration of a system including an information processing apparatus according to a first embodiment of the present invention. In the illustrated example, a system 10 includes terminal apparatuses 100A and 100B, a camera 210, microphones 220A and 220B, a display 230, and a server 300. The camera 210 and the microphone 220A are connected to the terminal apparatus 100A, and the microphone 220B and the display 230 are connected to the terminal apparatus 100B. Also, each of the terminal apparatuses 100A and 100B is connected to the server 300 via a network.

The terminal apparatuses 100A and 100B and the server 300 are implemented, for example, by a computer having a communication interface, a processor, and a memory. In the terminal apparatuses 100A and 100B and the server 300, functions of different sections which will be described below are realized by software as a result of operation of the processor according to a program stored in the memory or received via the communication interface. It should be noted that configurations of the terminal apparatuses and the server as described above are similar to those of other embodiments which will be described later.

The terminal apparatus 100A includes a physical movement feature quantity extraction section 110, a voice recognition section 120A, a situation information extraction section 130A, and a data transmission section 140. The physical movement feature quantity extraction section 110 acquires a feature quantity of a physical movement of a user U1 from an image acquired by the camera 210. The physical movement includes, for example, a motion of a body part and a change in facial expression or in direction of line of sight. The physical movement feature quantity extraction section 110 acquires a feature quantity from an image obtained by capturing a physical movement of the user U1, by using a recognizer configured by software. It should be noted that, because various known technologies are available regarding a recognizer that extracts various feature quantities from an image, a detailed description thereof will be omitted.

Meanwhile, the voice recognition section 120A recognizes details of an utterance of the user U1 from a voice acquired by the microphone 220A. The situation information extraction section 130A extracts situation information indicating a situation of the user U1, for example, through text analysis, from a voice recognition result of the user's utterance by the voice recognition section 120A, i.e., from details of the utterance. Because various known technologies are also available regarding voice recognition and text analysis, a detailed description thereof will be omitted. Also, the voice recognition section 120A may extract situation information from a feature quantity of an intonation or a stress of the utterance of the user U1.

Figure 2:
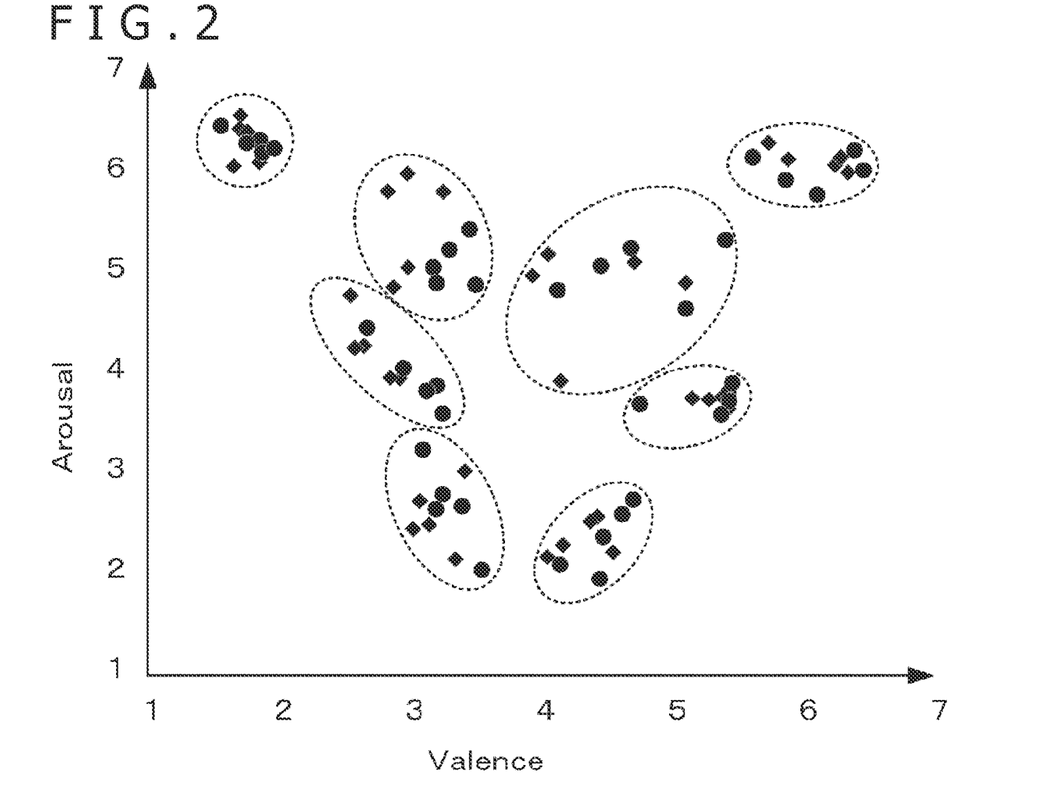
FIG. 2 is a diagram illustrating an example of a user's situation represented by using a Valence attribute and an Arousal attribute.

Here, in the present embodiment, situation information is information that classifies user's situations from a variety of aspects. For example, it is possible to extract metalinguistic situation information by performing text analysis on details of an utterance. In the present specification, situation information is extracted, for example, from a user's utterance but is not details of the utterance themselves. The situation information is metalinguistic in the sense that it is information for describing a user's situation estimated from the details of the utterance. Specifically, for example, by recognizing keywords that are unique to specific situations, such as "Yes" and "You are right" (agreement), "No" (disagreement), and "Good morning" and "Hello" (greeting), situation information that indicates such specific situations may be extracted. Also, by using first, second, and third person nouns included in details of an utterance, situation information may be extracted that indicates whether or not another person is present around the user and whether or not another person is a current topic of the conversation. Further, by analyzing a context of details of an utterance, situation information may be extracted that indicates user's emotions such as happiness, anger, sadness, and joy and user's likes and dislikes. The feature quantity of an intonation or a stress of an utterance may be used by itself as paralinguistic and metalinguistic situation information or may be used in combination with the text analysis of details of utterance to extract the abovementioned metalinguistic situation information. The user's situation indicated by situation information may be represented, for example, by using a Valence attribute and an Arousal attribute as illustrated in FIG. 2.

Referring again to FIG. 1, the data transmission section 140 of the terminal apparatus 100A transmits, to the server 300, the feature quantity of the physical movement of the user U1 extracted by the physical movement feature quantity extraction section 110 and the situation information extracted by the situation information extraction section 130A. Here, the data transmission section 140 transmits the feature quantity and the situation information to the server 300 after associating the feature quantity and the situation information with each other by using a timestamp or other information. That is, the feature quantity of the physical movement of the user U1 is transmitted to the server 300 together with the situation information indicating the situation of the user U1 when the physical movement in question is made.

The server 300 includes a data collection section 310, a relation learning section 330, and a map generation section 350. The data collection section 310 collects the feature quantity of the physical movement of the user U1 transmitted from the terminal apparatus 100A and the situation information indicating the situation of the user U1 when the physical movement in question is made. The collected feature quantity and situation information are accumulated as data 320 in the server 300. The data collection section 310 may collect, for example, feature quantities of various physical movements of the same user U1 and situation information indicating the situations of the user U1 when the respective physical movements are made. Also, the data collection section 310 may collect feature quantities of physical movements of a plurality of different users U1 and situation information indicating the situations of the users U1 when the physical movements in question are made.

The relation learning section 330 creates a learned model 340 by learning a relation between the feature quantity of the physical movement of the user U1 and the situation information from the data 320. Here, the learned model 340 is a model that classifies the feature quantities of the physical movements according to the situation information. In the present embodiment, situation information is acquired, for example, by using the text analysis, and is reliable and facilitates classification compared with a physical movement feature quantity. Accordingly, the relation learning section 330 uses situation information as a label and performs supervised learning of a feature quantity of a physical movement, and the learned model 340 can thus be created. It should be noted that, because various known technologies are available regarding specific techniques of machine learning, a detailed description thereof will be omitted.

The map generation section 350 generates, on the basis of the learned model 340, a map that can associate the situation information with the feature quantity of the physical movement. For example, in the case where the relation learning section 330 is an estimator that estimates situation information from a feature quantity of a physical movement, the relation learning section 330 can generate a map that can associate a certain piece of situation information with a feature quantity of a physical movement that is significantly related to the piece of situation information in question, by extracting a heavily weighted connection in a network of a final classification layer. As a technique for generating such a map, a lookup table may be generated by performing learning with a paralinguistic feature quantity or a feature quantity of a physical movement added, for example, when a technique used for natural language processing such as Word2Vec (open source) is used to produce distributed representation of words, and specifically, for example, to perform word embedding.

The terminal apparatus 100B includes a voice recognition section 120B, a situation information extraction section 130B, a data transmission/reception section 150, and a physical movement creation section 160. The voice recognition section 120B recognizes details of an utterance of a user U2 or another person who can be observed by the user U2, from a voice acquired by the microphone 220B. The situation information extraction section 130B extracts situation information indicating a situation of the user U2 or the other person, from a voice recognition result of the utterance of the user U2 by the voice recognition section 120B or from a feature quantity of an intonation or a stress of the utterance of the user U2.

Here, although the voice recognition section 120B and the situation information extraction section 130B of the terminal apparatus 100B acquire situation information of the user as in the case of the above terminal apparatus 100A, the case of the terminal apparatus 100B differs from the case of the terminal apparatus 100A in that situation information to be acquired is not limited to that of the user U2 and that situation information to be acquired may be that of another person who can be observed by the user U2. That is, while the voice recognition section 120A and the situation information extraction section 130A of the terminal apparatus 100A acquire the situation information indicating the situation of the user U1, the voice recognition section 120B and the situation information extraction section 130B of the terminal apparatus 100B acquire situation information indicating a situation observed by the user U2 (not necessarily the situation of the user U2 himself or herself).

The data transmission/reception section 150 transmits, to the server 300, the situation information (first situation information) acquired by the voice recognition section 120B and the situation information extraction section 130B and receives a feature quantity of a physical movement from the server 300. As described above, the server 300 generates, on the basis of the learned model 340, a map that can associate the situation information with the feature quantity of the physical movement. The feature quantity of the physical movement received by the data transmission/reception section 150 is a feature quantity associated with the abovementioned first situation information by this map.

The physical movement creation section 160 virtually creates a physical movement from the feature quantity received from the server 300 by the data transmission/reception section 150. The physical movement creation section 160 may output the virtually created physical movement, for example, as a motion of a virtual character displayed for the user U2 by the display 230, such as an avatar of the user U2 or an event hostess-like character. Alternatively, the physical movement creation section 160 may output the virtually created physical movement as a robot motion together with or in place of output by the display 230. Specifically, for example, the physical movement creation section 160 may be configured by using an autoencoder, a GAN (Generative Adversarial Network), or the like.

Here, the physical movement (second physical movement) virtually created by the physical movement creation section 160 reflects a learning result of the relation between the feature quantity of the physical movement (first physical movement) of the user U1 that was made in the past and the situation information (second situation information) indicating the situation of the user U1 when the physical movement in question was made. That is, the terminal apparatus 100B virtually creates a "physical movement that is most likely to be made by the user U1 in such a situation" from the situation information indicating the situation observed by the user U2.

According to the first embodiment of the present invention as described above, it is possible to virtually create a physical movement tailored to the situation observed by the user U2, on the basis of the learning result of the relation between the feature quantity of the physical movement and situation information of the user U1. For example, it becomes possible to render a physical movement that is output as a motion of a virtual character displayed for the user U2 more natural or more empathetic to the user U2.

Second Embodiment

Figure 3:
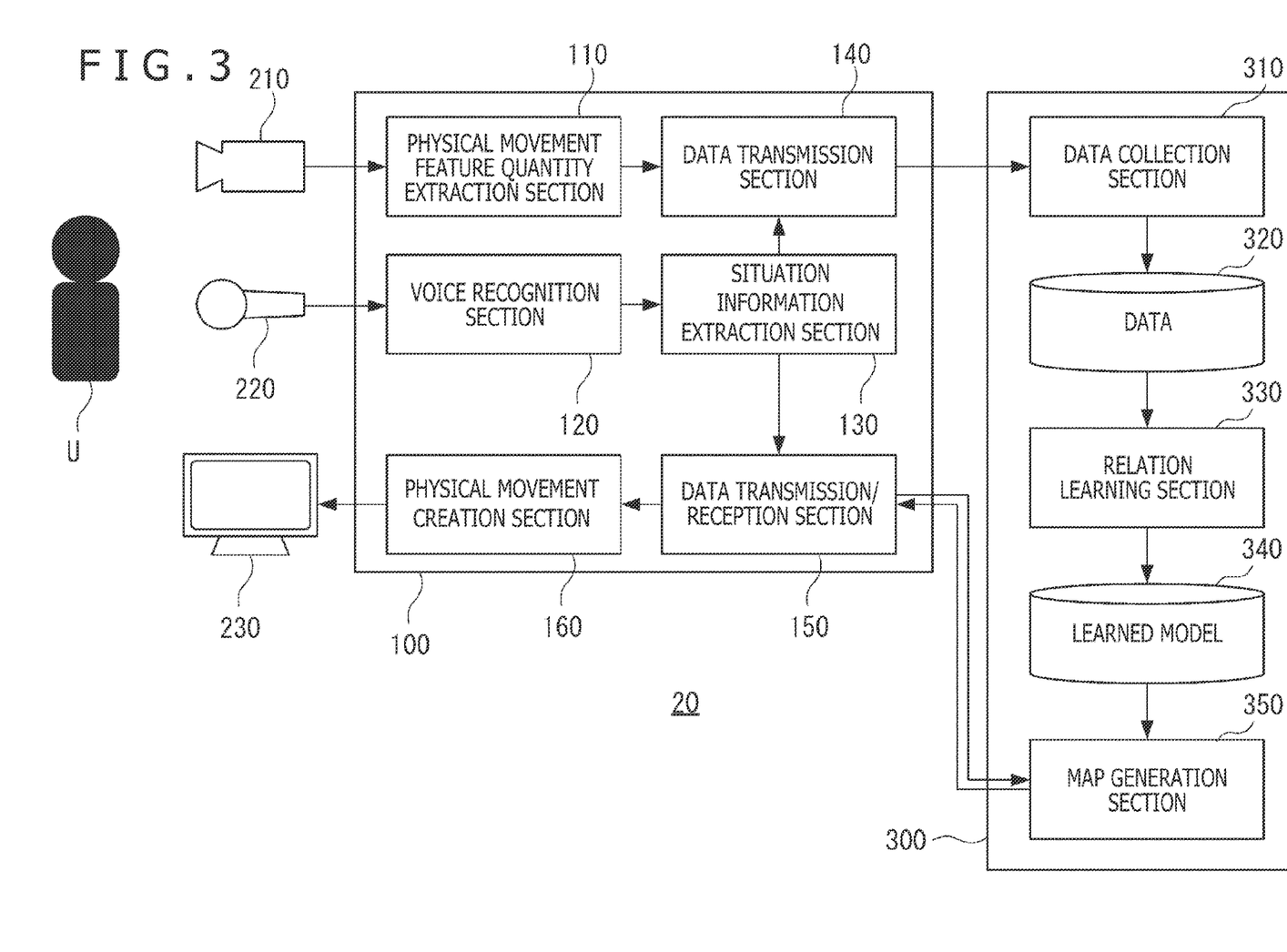
FIG. 3 is a block diagram illustrating a schematic configuration of a system including an information processing apparatus according to a second embodiment of the present invention.

FIG. 3 is a block diagram illustrating a schematic configuration of a system including an information processing apparatus according to a second embodiment of the present invention. In the illustrated example, a system 20 includes a terminal apparatus 100, the camera 210, a microphone 220, the display 230, and the server 300. As a difference from the abovementioned first embodiment, in the present embodiment, for example, a relation between a feature quantity of a physical movement and situation information is learned for a single user U identified by a user ID, and the physical movement corresponding to a situation observed by the user U is virtually created on the basis of the learning result.

In the illustrated example, the terminal apparatus 100 includes the physical movement feature quantity extraction section 110, a voice recognition section 120, a situation information extraction section 130, the data transmission section 140, the data transmission/reception section 150, and the physical movement creation section 160. Among these sections, the voice recognition section 120 has a combined function of the voice recognition section 120A and the voice recognition section 120B in the first embodiment, and the situation information extraction section 130 has a combined function of the situation information extraction section 130A and the situation information extraction section 130B in the first embodiment.

That is, in a stage of learning a relation in the server 300, the voice recognition section 120 and the situation information extraction section 130 acquire situation information indicating a situation of the user U when a physical movement is made, and the acquired situation information is transmitted to the server 300 from the data transmission section 140 together with a feature quantity of the physical movement. On the other hand, in a stage where the physical movement is virtually created by using the learning result of the relation in the server 300, the voice recognition section 120 and the situation information extraction section 130 acquire situation information indicating a situation observed by the user U, and the acquired situation information is transmitted to the server 300 from the data transmission/reception section 150.

The system 20 described above may be realized, for example, as a result of collection of feature quantities and situation information by the data collection section 310 of the server 300 together with IDs of the users U and learning of a relation for each of the IDs of the users U by the relation learning section 330. In this case, the learned model 340 includes a plurality of models each of which is created for each of the IDs of the users U. Alternatively, the system 20 may be complete within a home of the user U or elsewhere as a result of incorporation of the functions of the server 300 in the terminal apparatus 100. In this case, the learned model 340 may include only a model created for the single user U.

For example, after the learned model 340 is created by collecting data of a number of users using the system 10 of the first embodiment described above, the system 20 of the present embodiment can be used in the process of performing transfer learning for tailoring the created learned model 340 to the individual users U.

According to the second embodiment of the present invention as described above, it is possible to virtually create, on the basis of a learning result of a relation between a feature quantity of a physical movement of the user U and situation information, a physical movement tailored to a situation observed by the same user U. In this case, the virtually created physical movement is more natural or more empathetic to the user U.

Third Embodiment

Figure 4:
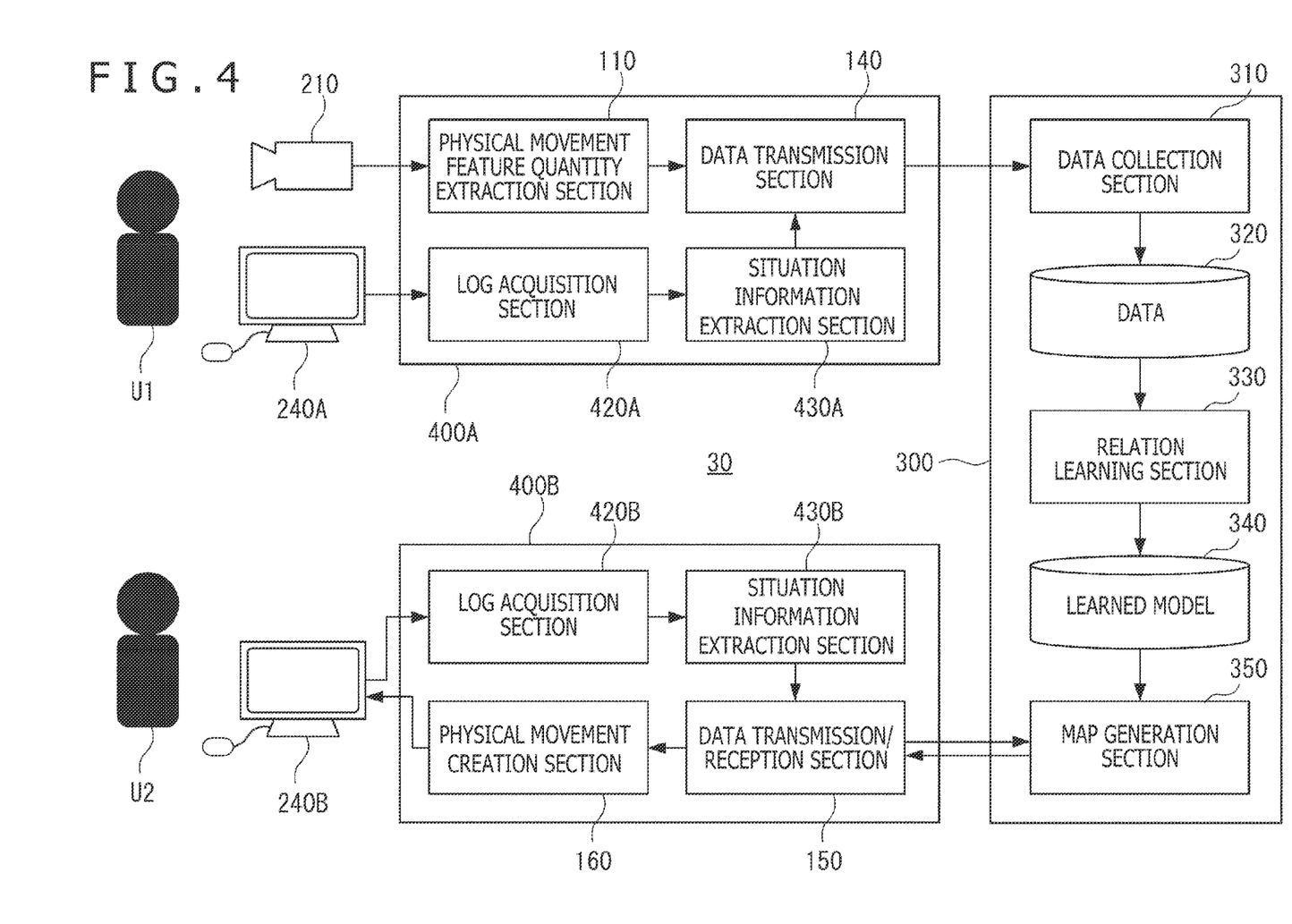
FIG. 4 is a block diagram illustrating a schematic configuration of a system including an information processing apparatus according to a third embodiment of the present invention.

FIG. 4 is a block diagram illustrating a schematic configuration of a system including an information processing apparatus according to a third embodiment of the present invention. In the illustrated example, a system 30 includes terminal apparatuses 400A and 400B, the camera 210, game consoles 240A and 240B, and the server 300. As a difference from the abovementioned first embodiment, in the present embodiment, for example, situation information is acquired by the game consoles 240A and 240B in place of a microphone. Also, the game console 240B is used to output a virtually created physical movement.

In the illustrated example, the terminal apparatus 400A includes the physical movement feature quantity extraction section 110, a log acquisition section 420A, a situation information extraction section 430A, and the data transmission section 140. The log acquisition section 420A acquires a log of interactive content, and specifically, a game played by the user U1 on the game console 240A. The situation information extraction section 430A extracts, from the log, situation information indicating a situation of the user U1.

Specifically, the situation information extraction section 430A may extract metalinguistic situation information by performing the text analysis on details of text input of the user U1 included in a chat log, as in the abovementioned first embodiment. Also, the situation information extraction section 430A may extract situation information from flag information, parameters, or the like in game content. In this case, the situation information extracted from flag information or a parameter of a game is not necessarily linguistically recognizable for the user and can thus be said to be non-linguistic situation information. The extracted situation information is transmitted to the server 300 from data transmission section 140 and is used for learning as in the abovementioned first embodiment.

Further, the terminal apparatus 400B includes a log acquisition section 420B, a situation information extraction section 430B, the data transmission/reception section 150, and the physical movement creation section 160. The log acquisition section 420B acquires a log of interactive content, and specifically, a game played by the user U2 on the game console 240B. The situation information extraction section 430B extracts, from the log, situation information indicating a situation observed by the user U2. The situation information extraction section 430B may extract the situation information from flag information or a parameter in game content.

Here, in the third embodiment, the log acquisition section 420B and the situation information extraction section 430B of the terminal apparatus 400B may also acquire, for example, situation information indicating a situation of the user U2 himself or herself in a game or situation information indicating a situation of another person who can be observed by the user U2 (including a virtual entity in the game), as in the first embodiment. The situation information extracted by the situation information extraction section 430B is transmitted to the server 300 from the data transmission/reception section 150, and a feature quantity of a physical movement associated with the situation information by a map is identified as in the first embodiment.

According to the configuration of the third embodiment of the present invention as described above, it is possible to virtually create a physical movement tailored to a situation observed by the user U2, on the basis of a learning result of a relation between a feature quantity of a physical movement and situation information of the user U1 by learning the relation using situation information extracted, for example, from a log of interactive content played by the user. Because the situation of the user in content can be determined from a log or the like with high accuracy, it is possible to precisely create physical movements appropriate to various situations that occur while the content is played.

It should be noted that the abovementioned embodiments of the present invention can be combined as appropriate. For example, by combining the first and third embodiments, situation information extracted from a feature quantity of an intonation or a stress of an utterance of the user as a result of voice recognition of the user's utterance and situation information extracted from a content log or the like may be used in combination. In this case, for example, it is possible to virtually create a physical movement corresponding to a situation inside the content, a physical movement corresponding to a situation outside the content, and a physical movement corresponding to a complex situation in which the situation inside the content and the situation outside the content are combined. Also, by combining the second and third embodiments, a relation between situation information extracted from a content log or the like and a feature quantity of a physical movement may be learned for the single user U, and a physical movement corresponding to a situation observed by the user U may virtually be created.

Also, in each embodiment, the functions of the terminal apparatus and the functions of the server are interchangeable with each other. That is, the functions described as those assumed to be implemented in the terminal apparatus in the abovementioned embodiments may be implemented in the server. For example, an image captured by a camera and a voice acquired by a microphone may be transmitted from the terminal apparatus to the server, and an image of a physical movement virtually created by the server may be transmitted to the terminal apparatus and displayed on the display. In such a manner, it is possible to implement all the described functions in the server. Alternatively, it is possible to implement all the described functions in the terminal apparatus in the case where learning is performed for a single user or where learning is performed for a plurality of users sharing the same terminal apparatus.

Figure 5:
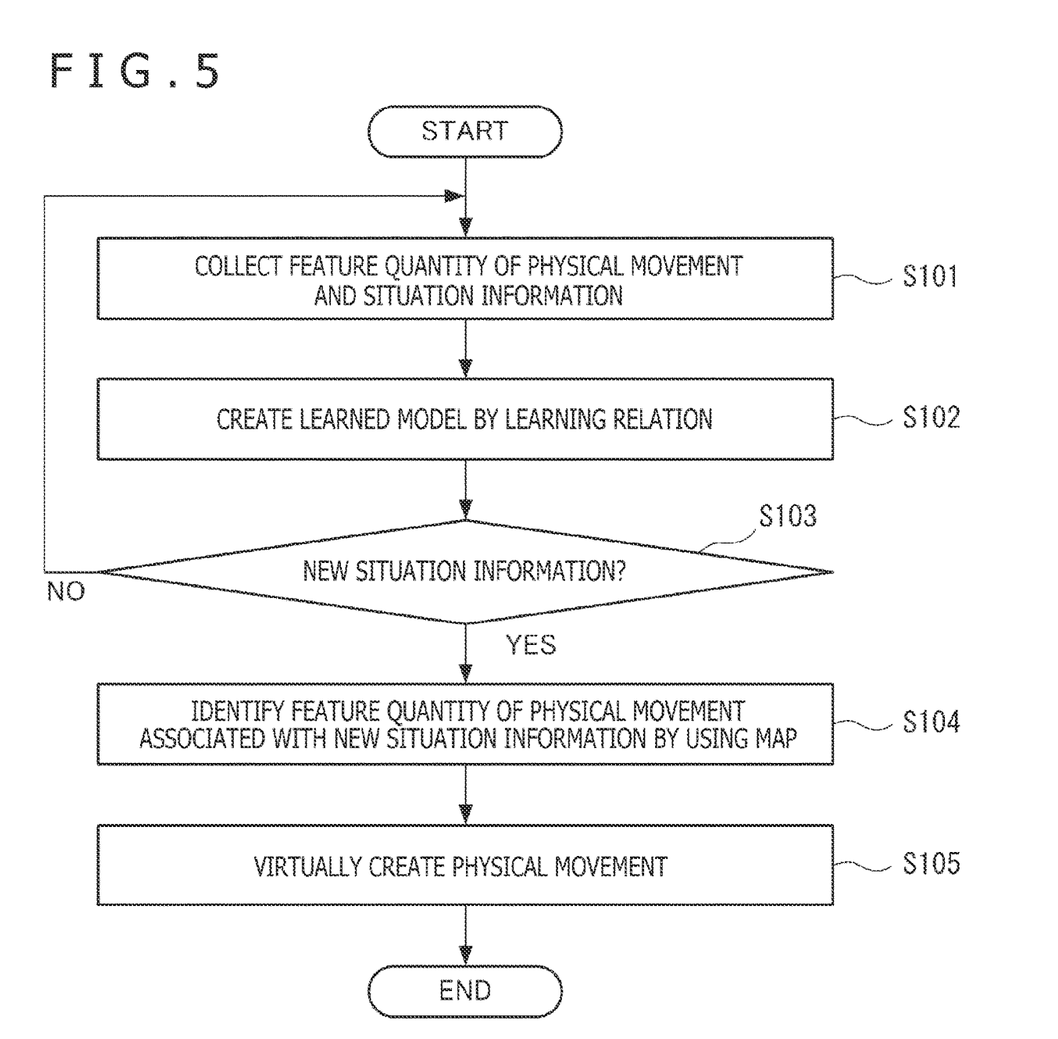
FIG. 5 is a flowchart illustrating an example of processing in the embodiment of the present invention.

FIG. 5 is a flowchart illustrating an example of processing in the embodiment of the present invention. Although a description will be given by using the components of the first embodiment, the same is true for other embodiments.

First, the data collection section 310 of the server 300 collects a feature quantity of a physical movement and situation information of the user U1 that are transmitted from the terminal apparatus 100A (step S101). Here, the feature quantity of the physical movement and the situation information are associated with each other. When the data 320 is accumulated, the relation learning section 330 creates the learned model 340 by learning a relation between the feature quantity of the physical movement and the situation information (step S102). In the case where new situation information is acquired by the terminal apparatus 100B after the learned model 340 has been created (YES in step S103), a feature quantity of a physical movement associated with the new situation information is identified by a map generated by the map generation section 350 on the basis of the learned model 340 (step S104). The identified feature quantity is transmitted to the terminal apparatus 100B, and the physical movement creation section 160 of the terminal apparatus 100B virtually creates a physical movement (step S105). In the case where new situation information is not acquired by the terminal apparatus 100B (NO in step S103), the collection of data transmitted from the terminal apparatus 100A (step S101) and the updating of the learned model (step S102) continue.

In the embodiments described above, the data collection section may collect a user ID or attribute information together with a feature quantity of a physical movement and situation information. Attribute information may include, for example, a user's age or gender, a community to which the user belongs, or other information. In this case, the relation learning section 330 creates the learned model 340 by learning the relation between the feature quantity of the physical movement and the situation information for each user ID or each piece of attribute information. In this case, feature quantities of different physical movements are identified, for example, from the same situation information as a result of generation of a map for each user ID or each piece of attribute information by the map generation section 350.

Figure 6:
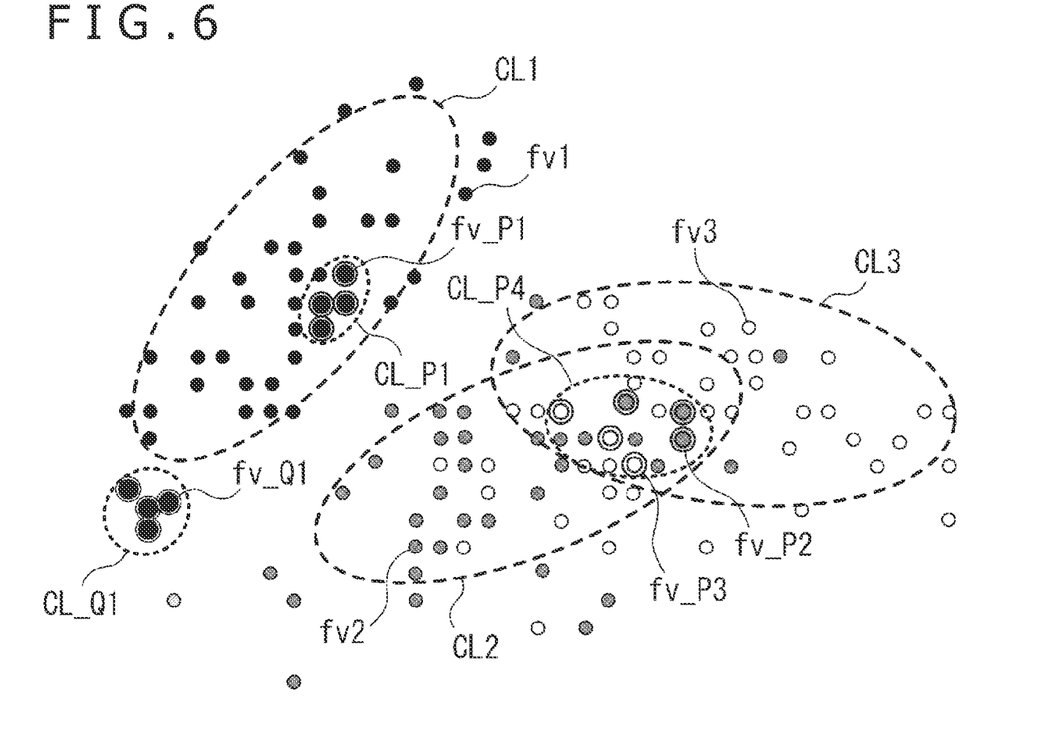
FIG. 6 is a diagram schematically illustrating an advantageous effect produced in the case where learning is performed for each user ID (Identification) or each piece of attribute information in the embodiment of the present invention.

FIG. 6 is a diagram schematically illustrating an advantageous effect produced in the case where learning is performed for each user ID or each piece of attribute information in the embodiment of the present invention. In FIG. 6, the feature quantity of the physical movement is schematically represented as a distribution on a two-dimensional plane. In the illustrated example, situation information is extracted by text analysis of details of a user's utterance. A feature quantity fv1 acquired together with situation information corresponding to a keyword "No," a feature quantity fv2 acquired together with situation information corresponding to a keyword "You are right," and a feature quantity fv3 acquired together with situation information corresponding to a keyword "Yes" are illustrated.

For example, in the case where feature quantities of physical movements are classified according to situation information regardless of a user ID or attribute information, a classification CL1 corresponding to "No," a classification CL2 corresponding to "You are right," and a classification CL3 corresponding to "Yes" are identified. In the illustrated example, these classifications are wide in range, and even if an attempt is made to generate, for example, a map that associates situation information with a feature quantity of physical information, there is a possibility that the feature quantity to be associated with the situation information may not be determined. Also, although the classifications CL2 and CL3 are not the same, they partially overlap, and it is not clear whether or not pieces of situation information corresponding to the respective classifications are associated with the same feature quantity.

In contrast, in the case where a feature quantity fv_P1 associated with an ID or attribute information of a specific user is extracted from the feature quantity fv1 corresponding to "No" and a relation between the feature quantity and situation information is learned, it is possible to identify a classification CL_P1 which is narrower in range. This makes it possible to output a feature quantity more suitable for situation information. Also, in the case where a feature quantity fv_Q1 associated with an ID or attribute information of another user is extracted, it is possible to identify a classification CL_Q1 that is not included in the overall classification CL1. This makes it possible, for example, to generate a map that associates a suitable feature quantity with situation information for an individual user exhibiting a tendency different from an overall tendency or a user having a specific attribute.

Also, for example, in the case where a feature quantity fv_P2 and a feature quantity fv_P3 that are associated with an ID or attribute information of a specific user are extracted from the feature quantity fv2 corresponding to "You are right" and the feature quantity fv3 corresponding to "Yes" and a relation between the feature quantity and situation information is learned, it is possible to identify a classification CL_P4 corresponding to both "You are right" and "Yes." This makes it clear that, for a user having the ID or attribute information in question, it is only necessary to associate the same feature quantity with situation information corresponding to "You are right" and "Yes."

Although several embodiments of the present invention have been described in detail above with reference to the attached drawings, the present invention is not limited to these examples. It is apparent that a person having ordinary knowledge in the technical field to which the present invention pertains can conceive of various examples of changes or modifications without departing from a technical idea described in the claims, and these changes and modifications are also naturally construed as falling within the technical scope of the present invention.

REFERENCE SIGNS LIST 10, 20, 30: System
100, 100A, 100B, 400A, 400B: Terminal apparatus
110: Physical movement feature quantity extraction section
120, 120A, 120B: Voice recognition section
130, 130A, 130B, 430A, 430B: Situation information extraction section
140: Data transmission section
150: Data transmission/reception section
160: Physical movement creation section
210: Camera
220, 220A, 220B: Microphone
230: Display
240A, 240B: Game console
300: Server
310: Data collection section
320: Data
330: Relation learning section
340: Learned model
350: Map generation section

The invention claimed is:

1. An information processing apparatus comprising:
circuitry configured to:
collect a feature quantity corresponding to a physical movement of a user and situation information indicating a situation of the user at a time of the physical movement, wherein the situation information comprises a timestamp that associates the situation of the user with the physical movement;
create a learned model for classification of the feature quantity of the physical movement according to the situation information, wherein the learned model comprises a machine learning model trained to classify the feature quantity of the physical movement based on a relation between the feature quantity of the physical movement and a label associated with the situation information; and
generate, on a basis of the learned model, a map that associates feature quantities of physical movements with corresponding situation information.

2. The information processing apparatus of claim 1, wherein the situation information includes at least either metalinguistic information extracted from a voice recognition result of an utterance of the user or paralinguistic information extracted from a feature quantity of an intonation or a stress of the utterance of the user.

3. The information processing apparatus of claim 1, wherein the situation information includes information extracted from a log of interactive content played by the user.

4. The information processing apparatus of claim 1, wherein the situation information includes information extracted from flag information or a parameter of interactive content played by the user.

5. The information processing apparatus of claim 1, wherein, the situation information represents the situation of the user by using a Valence attribute and an Arousal attribute.

6. The information processing apparatus of claim 1, wherein the physical movement includes a motion of a body part and a change in facial expression or in direction of line of sight.

7. The information processing apparatus of claim 1, wherein the circuitry is further configured to:
collect an identification or attribute information of the user, wherein the learned model learns a relation for identification or attribute information associated with the user.

8. The information processing apparatus of claim 1, wherein the circuitry is further configured to:
receive, after generation of the learned model, new situation information, wherein the new situation information indicates a new situation of the user; and
identify, using the map, a particular feature quantity of a physical movement associated with the new situation information.

9. A non-transitory, computer readable storage medium containing a program, which when executed by a computer, causes the computer to perform a method by carrying out actions, comprising:
collecting a feature quantity corresponding to a physical movement of a user and situation information indicating a situation of the user at a time of the physical movement, wherein the situation information comprises a timestamp that associates the situation of the user with the physical movement;
creating a learned model for classification of the feature quantity of the physical movement according to the situation information, wherein the learned model comprises a machine learning model trained to classify the feature quantity of the physical movement based on a relation between the feature quantity of the physical movement and a label associated with the situation information; and
generating, on a basis of the learned model, a map that associates feature quantities of physical movements with corresponding situation information.

* * * * *